(12) United States Patent
Backman et al.

(10) Patent No.: US 9,093,937 B2
(45) Date of Patent: Jul. 28, 2015

(54) METHOD AND APPARATUS FOR DETERMINING POSITION FOR A PERMANENT MAGNET ELEVATOR MOTOR

(71) Applicant: Magnetek, Inc., Menomonee Falls, WI (US)

(72) Inventors: John Backman, Colgate, WI (US); Garry Anderson, Irchester (GB)

(73) Assignee: Magnetek, Inc., Menomonee Falls, WI (US)

( * ) Notice: Subject to any disclaimer, the term of this patent is extended or adjusted under 35 U.S.C. 154(b) by 172 days.

(21) Appl. No.: 13/940,497

(22) Filed: Jul. 12, 2013

(65) Prior Publication Data

US 2015/0015170 A1 Jan. 15, 2015

(51) Int. Cl.
*H02P 6/16* (2006.01)
*H02P 6/06* (2006.01)

(52) U.S. Cl.
CPC ... *H02P 6/16* (2013.01); *H02P 6/06* (2013.01)

(58) Field of Classification Search
CPC ......... B66B 1/30; H02P 2203/01; H02P 6/06; H02P 6/16; H02P 6/185
USPC ............... 318/400.4, 400.12, 400.13, 400.14, 318/400.37; 324/244.1, 207.12, 207.13, 324/207.11; 702/94
See application file for complete search history.

(56) References Cited

U.S. PATENT DOCUMENTS

| 4,625,557 | A | * | 12/1986 | Rutherford | 73/635 |
| 4,675,604 | A | * | 6/1987 | Moyer et al. | 324/220 |
| 4,818,908 | A | | 4/1989 | Tama et al. | |
| 5,148,377 | A | * | 9/1992 | McDonald | 702/95 |
| 5,297,055 | A | * | 3/1994 | Johnstone | 700/195 |
| 5,747,755 | A | | 5/1998 | Coste et al. | |
| 5,796,228 | A | * | 8/1998 | Kojima et al. | 318/605 |
| 5,945,644 | A | * | 8/1999 | Jang | 187/296 |
| 5,963,882 | A | * | 10/1999 | Viertl et al. | 702/39 |
| 6,059,062 | A | * | 5/2000 | Staelin et al. | 180/181 |
| 6,791,219 | B1 | | 9/2004 | Eric et al. | |
| 6,922,028 | B2 | | 7/2005 | Akizuki | |
| 6,970,108 | B1 | | 11/2005 | Cullen | |
| 7,199,547 | B2 | * | 4/2007 | Kaneko et al. | 318/400.08 |
| 7,423,394 | B2 | | 9/2008 | Collins | |
| 7,521,885 | B2 | | 4/2009 | Schwarzkopf | |
| 7,768,219 | B2 | | 8/2010 | Kausch | |
| 7,808,200 | B2 | | 10/2010 | Liu et al. | |

(Continued)

OTHER PUBLICATIONS

International Search Report and the Written Opinion of the International Searching Authority, dated Mar. 11, 2015. Patent Application No. PCT/US2014/045682—(17) pages.

*Primary Examiner* — Rita Leykin
(74) *Attorney, Agent, or Firm* — Boyle Fredrickson, S.C.

(57) ABSTRACT

A system for determining the angular position of a synchronous motor includes an encoder with a friction wheel engaging a rotating surface of the motor. The friction wheel is spun by the rotation of the motor, and the encoder generates a signal corresponding to the angular position of the friction wheel. An independent, sensor is provided to generate a pulse once per revolution of the motor. The independent sensor detects the presence of a target on the rotating surface of the motor and generates the pulse when the target is proximate to the sensor. A controller receives the signal corresponding to the angular position of the friction wheel as well as the pulse generated by the independent sensor to determine the angular position of the motor. The controller compensates the angular position of the motor each time the pulse is generated, correcting accumulated position error.

16 Claims, 4 Drawing Sheets

(56) References Cited

U.S. PATENT DOCUMENTS

| | | |
|---|---|---|
| 8,198,842 B2 | 6/2012 | Walrafen |
| 8,350,505 B2 | 1/2013 | Krause et al. |
| 8,446,121 B1 | 5/2013 | Parsa et al. |
| 2005/0156550 A1 | 7/2005 | Kamio et al. |
| 2010/0133046 A1 | 6/2010 | Allwardt et al. |
| 2011/0108369 A1* | 5/2011 | Stolt et al. ............... 187/391 |
| 2011/0203871 A1* | 8/2011 | Faye et al. ................ 182/3 |
| 2011/0278097 A1* | 11/2011 | Altenburger et al. ......... 187/255 |

* cited by examiner

METHOD AND APPARATUS FOR DETERMINING POSITION FOR A PERMANENT MAGNET ELEVATOR MOTOR

BACKGROUND OF THE INVENTION

The subject matter disclosed herein relates to a method of determining the position of a motor and, more specifically, to a method for compensating accumulated position error in a motor drive for a synchronous motor.

As is known in the art, synchronous motors are designed such that the rotor rotates at the same speed as the rotating magnetic field established in the stator. In a permanent magnet (PM) synchronous motor, magnets are embedded in or mounted to the rotor and establish the magnetic field in the rotor. As an alternating current (AC) voltage is provided to the stator, a magnetic field is established in the stator. The magnitude of torque produced by the PM motor is a function of the angular alignment of the magnetic fields present in the stator and rotor. Because the rotor magnetic field is always present, it is desirable to know the angular position of the rotor and the relationship of the rotor magnetic field to the angular position of the rotor such that the AC voltage may be applied to the stator at the correct electrical angle. An encoder may be mounted to the PM motor to provide a measurement of the angular position.

One application in which PM synchronous motors are being used is to control the operation of an elevator cab. Historically, either direct current (DC) motors or AC induction motors have been the primary motor utilized to control the elevator cab. These motors are mounted in a machine room, often on the roof of a building, above the elevator shaft. The motors are connected via a gearbox to a sheave around which the ropes to the elevator cab are run. PM motors however, provide greater torque density, allowing a motor physically smaller than the DC or AC motor to control an elevator cab of comparable capacity. In addition to providing greater torque density, PM motors for controlling elevator cabs have been designed to provide a smaller footprint. These PM motors may include a high pole count, radial flux construction, and external rotors. The motors are typically larger in radius than axial length and may further include a sheave mounted to the rotor providing direct drive of the elevator cab. The improved torque density and physical construction may also allow the PM motor to be mounted in the elevator shaft eliminating the machine room which, in turn reduces expense and improves the aesthetics of a building.

However, the physical construction of the PM motor can impact the ability to mount an encoder to the motor. Because of the external rotor, the PM motor may not include a central rotating member. If the PM motor is, for example, a dual-rotor motor including a central rotating member, it may nevertheless be undesirable to include a shaft extending axially to which an encoder may be mounted. The shaft will increase the axial length of the PM motor, which, for a shaft-mounted PM motor, protrudes further into the elevator shaft. Consequently, an encoder that includes a friction wheel, which is mounted radially from the PM motor, configured to engage a surface of the external rotor may be mounted to the PM motor.

However, an encoder utilizing a friction wheel to engage a rotor has various disadvantages. Rather than being driven directly by the rotor, the encoder is driven by the friction wheel. As a result, the encoder generates an angular position signal that corresponds to the angular position of the friction wheel. The friction wheel has a diameter that may be several times smaller than the diameter of the rotating surface which it engages. In order to determine the angular position of the rotor, the ratio between the diameter of the friction wheel and the rotating surface must be used. Error in the value of the angular position for the rotor may be accumulated as a function of the level of precision used for the ratio. Further, the friction wheel is subject to slippage against the rotating surface, resulting in further position error between the angular position signal generated by the encoder and the angular position of the rotor. Because the PM motor may have a high pole count, a small amount of error in determining the angular position of the rotor may result in a substantial error in the electrical angle of the voltage applied to the stator.

Recently, methods of compensating the angular position to correct accumulated position errors have been developed. These methods utilize sensorless techniques to determine an estimated angular position of the motor. The sensorless techniques use either commanded or measured values of electrical signals, such as the voltage or current provided to the motor, to determine the angular position of the motor. The angle of the electrical signal is extracted twin the commanded or measured value and, based on the properties of the motor and knowledge of how the motor would respond to the electrical signal, the angular position of the motor is determined. However, these sensorless techniques often rely on electrical signals that are either not well defined or subject to electrical noise at low speeds. As a result, they are unable to compensate accumulated position error below, for example, one-third of rated speed. Thus, it would be desirable to provide a system that is able to compensate accumulated position error across the full operating range of the motor.

BRIEF DESCRIPTION OF THE INVENTION

The subject matter disclosed herein describes a system for determining the angular position of a synchronous motor. An encoder with a friction wheel engages a rotating surface of the motor. The friction wheel is spun by the rotation of the motor, and the encoder generates a signal corresponding to the angular position of the friction wheel. An independent sensor, such as a proximity sensor, is provided to generate a pulse once per revolution of the motor. The independent sensor detects the presence of a target affixed to or integrally formed with the rotating surface of the motor and generates the pulse when the target is proximate to the sensor. A controller receives the signal corresponding to the angular position of the friction wheel as well as the pulse generated by the independent sensor to determine an angular position of the motor. The controller compensates the angular position of the motor each time the pulse is generated, correcting position error generated, for example, due to slippage of the friction wheel.

According to one embodiment of the invention, a system for determining an angular position of a permanent magnet (PM) motor controlling an elevator cab is disclosed. The PM motor includes a rotor having at least one external rotating surface. The system includes a friction wheel configured to engage one of the external rotating surfaces to cause rotation of the friction wheel responsive to rotation of the rotor. An encoder is operatively connected to the friction wheel and configured to generate at least one signal corresponding to the rotation of the friction wheel. A target is located on one of the external rotating surfaces, and a non-contact sensor is mounted to the PM motor. The non-contact sensor is configured to generate a signal corresponding to the target being located within a detection distance from the non-contact sensor. A motor drive is configured to control the PM motor. The motor drive includes a first input configured to receive the signal corresponding to the rotation of the friction wheel, a second input configured to receive the signal from the non-contact sensor, a memory device configured to store a program, and a processor configured to execute the program. The processor executes the program to determine an uncompensated angular position of the PM motor as a function of the signal corresponding to the rotation of the friction wheel and to determine a compensated angular position of the PM motor as a function of the uncompensated angular position value and of the signal from the non-contact sensor.

According to another aspect of the invention, the target is located at a reference position. The reference position is stored in the memory device, and the uncompensated angular position of the PM motor is further determined as a function of the reference position. The target may be integrally formed with the rotating surface, and the non-contact sensor may be, but is not limited to, a magnetic or an optical proximity sensor.

According to yet another aspect of the invention, the friction wheel has a first diameter, the rotating surface of the synchronous motor has a second diameter, and the processor is further configured to determine the uncompensated angular position of the PM motor as a function of a ratio between the first diameter and the second diameter.

According to another embodiment of the invention, a system for determining angular position of a synchronous motor includes an encoder having a friction wheel operatively coupled to the encoder. The encoder is configured to generate a signal corresponding to an angular position of the friction wheel, and an outer surface of the friction wheel is configured to engage a rotating member of the synchronous motor. A target is located on the rotating member of the synchronous motor, and a sensor is fixedly mounted proximate to the rotating member of the synchronous motor. The sensor is configured to generate a pulse when the target passes the sensor, and a motor drive is configured to control operation of the synchronous motor. The motor drive includes a first input configured to receive the signal from the encoder, a second input configured to receive the pulse from the sensor, a memory device configured to store a program, and a processor configured to execute the program to determine an angular position of the synchronous motor as a function of the signal from the encoder and to compensate the angular position of the synchronous motor when the pulse is received at the second input. The sensor may be a non-contact sensor configured to generate the pulse when the target is located within a detection distance from the sensor.

According to yet another embodiment of the invention, a method of compensating for position error in a motor drive configured to control a synchronous motor is disclosed. The method includes the steps of mounting an encoder having a friction wheel such that the friction wheel engages a rotating surface of the synchronous motor, mounting a sensor to the synchronous motor proximate to the rotating surface of the synchronous motor, and affixing a target to the rotating surface of the synchronous motor such that the target passes the sensor once per revolution of the synchronous motor. A signal is generated with the encoder corresponding to an angular position of the friction wheel and is transmitted to a processor in the motor drive. A pulse is generated with the sensor each time the target passes the sensor and is transmitted to the processor in the motor drive. An angular position of the synchronous motor is determined in the processor as a function of the signal from the encoder and is compensated each time a pulse is received from the sensor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
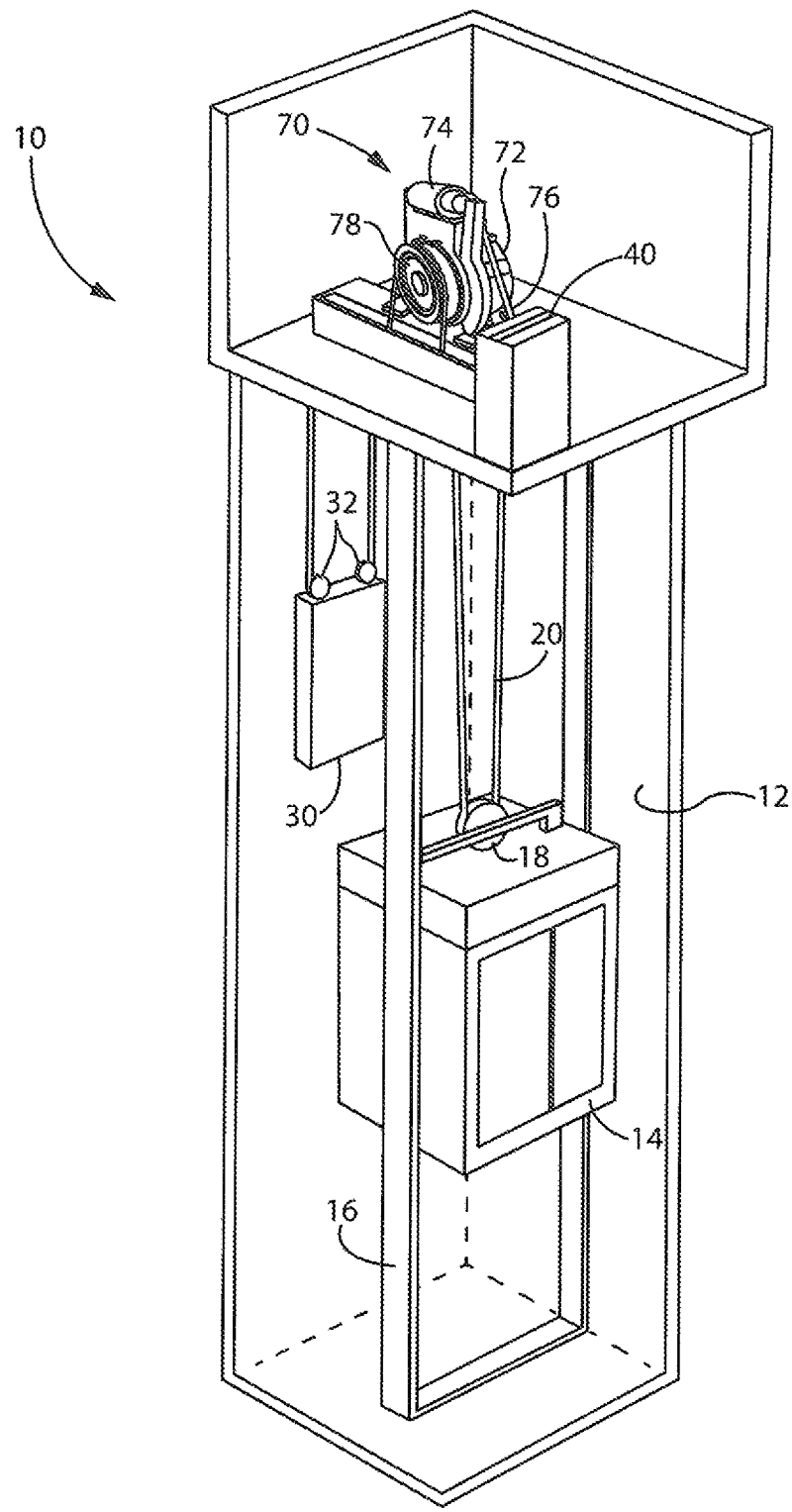
FIG. 1 is an exemplary elevator shaft incorporating a motor and motor drive utilizing a position detection system according to one embodiment of the invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached." or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, an exemplary elevator 10 incorporating one embodiment of the present invention is illustrated. The elevator shaft 12 includes a cab 14 configured to move up and down the shaft 12. The cab 14 includes, for example, wheels configured to engage the rails 16 extending vertically along each side of the shaft 12 to maintain the horizontal alignment of the cab 14 within the shaft 12. Cables 20 extending around a sheave, or pulley, 18 mounted to the top of the cab 14 are used to raise and lower the cab 14 within the shaft 12. According to the illustrated embodiment, a first end of the cables 20 are fixedly mounted to a first point at the top of the shaft 12 and routed down and around the sheave 18 mounted to the top of the cab 14. The cables 20 are then routed over a sheave 78 mounted to the motor 70. The cables 20 continue around one or more sheaves 32 mounted to a counterweight 30 and back to a second point at the top of the shaft 12. It is contemplated that various other configurations of cables 20, sheaves 18, and cable routing may be utilized according to the application requirements without deviating from the scope of the invention.

According to the illustrated embodiment, the motor 70 is mounted in a machine room located above the elevator shaft 12. Optionally, the motor 70 may be mounted in the elevator shaft 12. The motor 70 is an axial flux permanent magnet (PM) synchronous motor with a sheave 78 mounted to the rotor. A junction box 74 is mounted to the top of the housing 72. One or more electrical conductors 76 run between the junction box 74 and a motor drive 40. The electrical conductors 76 may be single conductors, multi-conductor cables, or a combination thereof, conducting signals between the motor drive 40 and the motor 70. The signals include, but are not limited to, electrical power to the motor, brake control, and position feedback.

Figure 2:
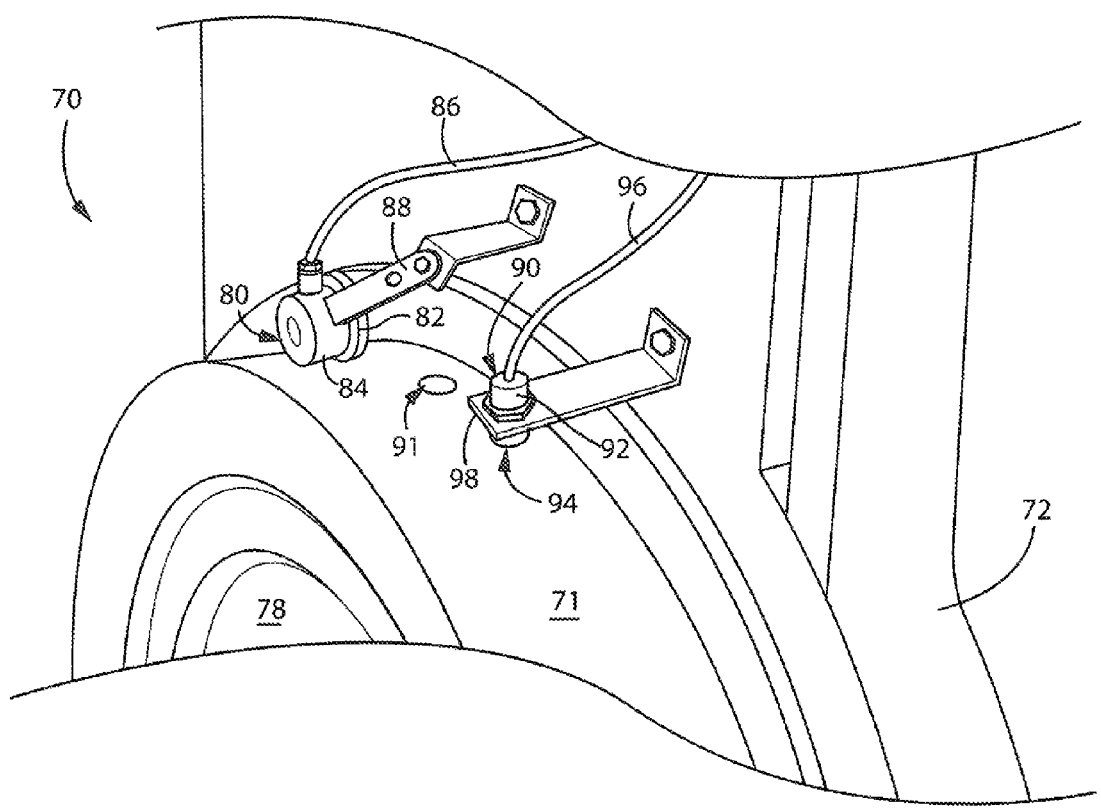
FIG. 2 is a partial isometric view of the position detection system of FIG. 1.

Turning next to FIG. 2, a position feedback system according to one embodiment of the invention includes an encoder 80 and a sensor 90, each mounted to the housing 72 of the motor 70. The encoder 80 includes a friction wheel 82 which is configured to engage a rotating surface 71 of the motor 70. A body 84 of the encoder 80 includes a transducer operatively connected to the fiction wheel 82 to convert the rotary motion of the friction wheel 82 into an electronic signal. The body 84 of the encoder 80 also includes an electronic circuit configured to transmit the electric signal from the transducer to a controller via an encoder cable 86. A mounting bracket 88 secures the body 84 of the encoder 80 to the housing 72 of the motor 70 and is positioned such that the friction wheel 82 engages a rotating surface 71 of the motor 70.

According to one embodiment of the invention, the sensor 90 is a non-contact sensor. The non-contact sensor 90 includes a body 92 having a detection surface 94. A mounting bracket 98 secures the non-contact sensor 90 to the housing 72 of the motor 70 and positions the detection surface 94 near the rotating surface 71 of the motor 70. A target 91 is affixed to the rotating surface 71 such that it passes by the detection surface 94 of the non-contact sensor 90. Optionally, multiple targets 91 may be affixed to the rotating surface 71 or a sensor 90 physically contacting the rotating surface 71 may be used. According to still other embodiments of the invention, the target 91 may be integrated with the rotating surface 71 and may be, for example, a raised member on the rotating surface or an image painted on the rotating surface 71. The non-contact sensor 90 may be, but is not limited to, a magnetic or an optical sensor detecting a ferrous or reflective target, respectively. The non-contact sensor 90 includes an electronic circuit configured to generate a signal when the target 91 is located at or less than a detection distance from the non-contact sensor 90. The signal may be a pulse 93, where the signal is on while the target is within a detection distance from the sensor 90 and off when the target is outside the detection distance, and the pulse 93 is transmitted via a cable 96 to a controller.

According to the illustrated embodiment, the rotating surface 71 is a generally cylindrical surface. The rotating surface 71 may be an external rotor where the stator windings are enclosed, at least in part, within the rotating surface 71. Optionally, the rotating surface 71 may be an outer periphery of for example, a drum having an outer periphery which defines the rotating surface 71 and at least one side defining a surface within the outer periphery. The side of the drum may be mounted to the rotor such that the drum rotates with the rotor. According to one embodiment of the invention, the rotating surface 71 is configured to be engaged by brake pads to stop the motor 70. Optionally, the side may extend beyond the outer periphery of the rotating surface 71 forming a disc which caliper brakes are configured to engage to stop the motor. It is contemplated that the encoder 80 may be mounted directly to the motor 70 or to another rigid structure such that the friction wheel 82 may engage the rotating surface 71, the disc, a sheave 78 mounted axially outward from the motor 70, or any other suitable external surface configured to rotate with the rotation of the motor 70.

Figure 3:
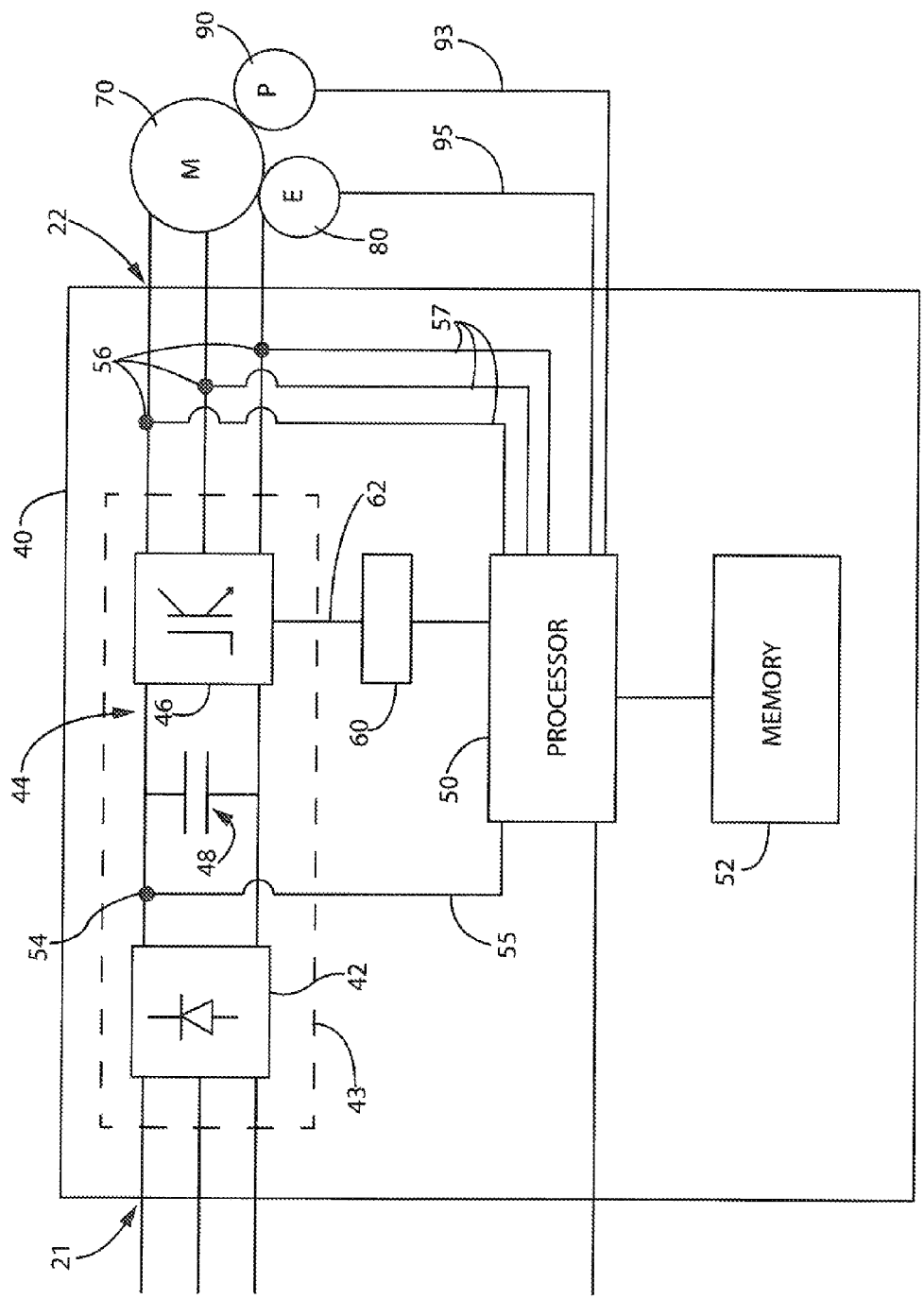
FIG. 3 is a block diagram representation of the motor, motor drive, and position detection system of FIG. 1.

Referring also to FIG. 3, the motor drive 40 includes a power conversion section 43. The power conversion section 43 converts the input power 21 to the desired voltage at the output 22. According to the illustrated embodiment, the power conversion section 43 includes a rectifier section 42 and an inverter section 46, converting a fixed AC input 21 to a variable amplitude and variable frequency AC output 22. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The rectifier section 42 converts the AC voltage input 21 to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor drive 40. An inverter section 46 converts the DC voltage on the DC bus 44 to the desired voltage at the output 22 for the motor 70 according to switching signals 62.

The motor drive 40 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, or a combination thereof. The memory device 52 preferably stores parameters of the motor drive 40 and one or more programs, which include instructions executable on the processor 50. A parameter table may include an identifier and a value for each of the parameters. The parameters may, for example, configure operation of the motor drive 40 or store data for later use by the motor drive 40.

Figure 4:
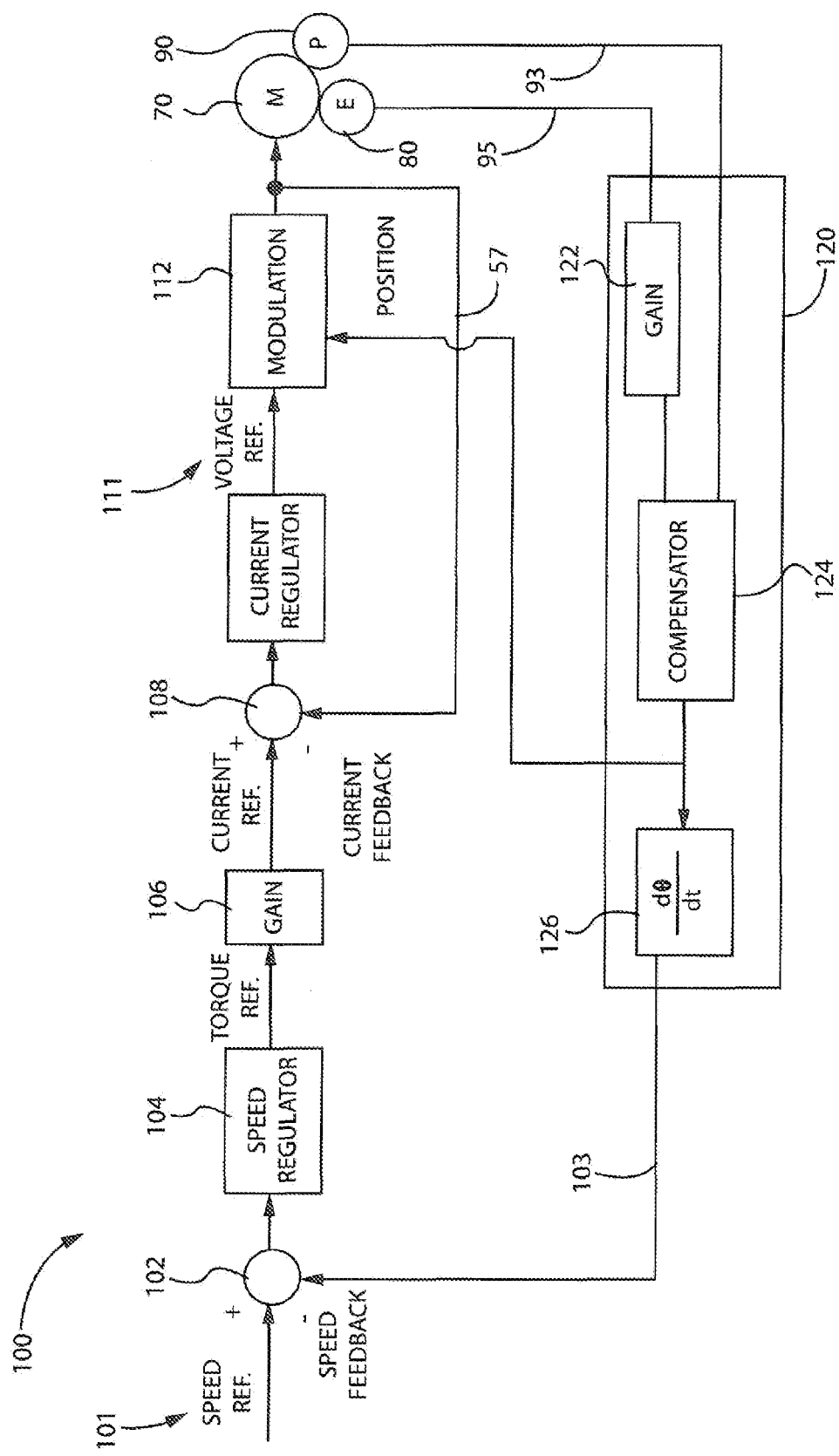
FIG. 4 is a block diagram representation of an exemplary motor control module executing in the motor drive of FIG. 1.

The processor 50 is configured to execute a motor control module 100, as shown in FIG. 4. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor drive 40 respectively. The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

The processor 50 is also configured to generate a voltage reference 111 to the motor 70 corresponding to the necessary amplitude and frequency to run the motor 70 at the desired speed reference 101. The system includes a position sensor 80, such as an encoder or resolver, mounted to the motor 70 and connected to the motor drive 40 via an electrical connection 86 to provide a position feedback signal 95 to the processor 50. The encoder 80 is driven by the friction wheel 82 to generate the position feedback signal 95. The system also includes a sensor 90 mounted to the motor 70 and connected to the motor drive 40 via an electrical connection 96 to provide a pulse 93 to the processor 50 each time the target 91 passes the sensor 90. Both the position feedback signal 95 and the pulse 93 are provided as inputs to a feedback module 120. The feedback module 120 includes a gain block 122 which converts the position feedback signal 95 to an uncompensated angular position of the motor 70 and a compensator 124 which corrects the angular position of the motor 70 each time a pulse 93 is input to the feedback module 120. The compensated position is provided as an input to a derivate block 126 to determine a speed feedback signal 103 corresponding to the angular velocity of the motor 70.

According to the illustrated embodiment, the motor control module 100 receives a speed reference 101 and compares it to the speed feedback signal 103 at a summing junction 102. The difference between the speed reference 101 and the speed feedback signal 103 is provided as an input to the speed regulator 104. The speed regulator 104 may be any suitable controller such as a proportional (P), proportional-integral (PI), or proportional-integral-derivative (PID) controller. The speed regulator 104 may further include filters, additional gain elements, or other elements according to the performance requirements. A torque reference is output from the speed regulator 104 and provided as an input to a gain block 106 which converts the torque reference to a current reference. The current reference is compared to a current feedback signal 57 at summing junction 108. The difference between the current reference and the current feedback 57 is provided as an input to the current regulator 110. The current regulator 110 may be any suitable controller such as a proportional (P), proportional-integral (PI), or proportional-integral-derivative (PID) controller. The current regulator 110 may further include filters, additional gain elements, or other elements according to the performance requirements. The current regulator 110 outputs the voltage reference 111 which is provided as an input to the modulation module 112 along with the compensated angular position 113. The modulation module 112 generates the switching signals 62 used to control the inverter section 46 and to convert the DC voltage on the DC bus 44 to the desired voltage at the output 22 for the motor 70. It is contemplated that various other configurations of the motor control module 100 may be utilized to generate the voltage reference 111 without deviating from the scope of the invention as long as the motor control module 100 utilizes the position feedback signal 95 and the pulse 93 to generate the angular position signal 113.

In operation, the encoder 80 and the sensor 90 are used by the motor drive 40 to determine the angular position of the motor 70. The encoder 80 generates a position feedback signal 95 corresponding to the rotation of the friction wheel 82. The position feedback signal 95 may be, but is not limited to, a single pulse train, a pair of pulse trains offset by 90 degrees, a single sinusoidal waveform, or a pair of sinusoidal waveforms offset by 90 degrees. As the friction wheel 82 rotates, the encoder 80 continually generates the position feedback signal 95 and transmits it to the motor drive 40.

The motor drive 40 uses the position feedback signal 95 to track the angular position of the motor 70. Typically, a dedicated circuit tracks transitions in state of the pulse train or reads the current value of the sinusoidal waveforms and stores a value of the position in the memory device 52 for subsequent processing. The processor 50 reads the value of the position. For example, the position feedback signal 95 may be a pulse train generating 1024 pulses per revolution of the friction wheel 82. The dedicated circuit may provide a value from 0-1023 corresponding to the angular position of the friction wheel. The processor 50 reads the position from the memory device to determine the relative angular position of the friction wheel 82 over one rotation of the friction wheel 82. A commissioning routine may be used to identify a reference point and associate the reference point to a specific value of the angular position such that the processor 50 knows the absolute position of the friction wheel 82 as well. According to one embodiment of the invention, the reference point may be the target 91 located on the rotating surface 71 of the motor 70. Optionally, the dedicated circuit is a counter circuit that increments with each pulse 93 received in one direction and decrements with each pulse 93 received in the opposite direction. The processor 50 reads the present number of counts and compares it to the previous number of counts to determine the current angular position of the friction wheel 82. It is contemplated that various other methods of processing the position feedback signal 95 to generate an angular position of the friction wheel 82 may be utilized without deviating from the scope of the invention.

The processor 50 converts the angular position of the friction wheel 82 to an uncompensated value of angular position of the motor 70. The friction wheel 82 has a fixed diameter and the rotor, or other rotating surface, 71 of the motor 70 has a fixed diameter. The values of the diameter for both the friction wheel 82 and the rotating surface 71 may be stored in the memory device 52. Optionally, a value of the ratio between the diameter of the friction wheel 82 and the diameter of the rotating surface 71 may be stored in memory. The processor 50 converts the angular position of the friction wheel 82 into the uncompensated angular position value of the motor 70 as a function of the ratio between the two diameters. For example, the diameter of the friction wheel 82 may be 5 inches and the diameter of the rotating surface may be 50 inches. The processor 50 determines the number of rotations of the friction wheel 82 that are required during one rotation of the motor 70. The processor 50 may maintain, for example, a counter which increments each time the friction wheel 82 completes a rotation in the first direction and which decrements each time the friction wheel 82 completes a rotation in the opposite direction. By maintaining a running total of the number of revolutions of the friction wheel 82 as well as utilizing the current angular position of the friction wheel 82 the processor 50 determines the uncompensated angular position value of the motor 70. With reference to FIG. 4, it is contemplated that the gain block 122 executes the necessary instructions to convert the position feedback signal 95 to the uncompensated angular position of the motor 70.

Having determined the uncompensated angular position of the motor 70, the processor 50 further executes the compensator 124 to correct for error in the value of the uncompensated angular position of the motor 70. The error may arise for example due to internal calculations in converting the angular position of the friction wheel 82 to the angular position of the motor 70. The precision at which the diameter of the friction wheel 82 and the diameter of the rotating surface 71 is known as well as the precision at which the conversion is performed may introduce error. Further, the friction wheel 82 may be subject to slipping with respect to the rotating surface 71 due, for example, to vibration and/or sudden acceleration/deceleration. Due to the high number of poles used in many synchronous PM motor 70 for elevators, a small error in the physical angular position of the PM motor 70 results in a more significant error for the electrical angle of the voltage applied to the stator of the PM motor 70. The sensor 90 is provided to generate a pulse 93 each time the target 91 passes the sensor 90. The target 91 is located at a known angular position, defining a reference point on the motor 70. It is contemplated that the relationship between the target 91 and the angular position of the motor may be established by an initial commissioning procedure and the value stored in the memory device 52. Each time the target 91 passes the sensor 90 the processor 50 receives the pulse 93 and compares the angular position of the motor 70 to the reference value. The compensator 124 corrects the angular position of the motor 70 so that it aligns with the reference value. Correction may occur, for example, by the addition or subtraction of the difference between the angular position of the motor 70 and the reference position or by a gradual change in the angular position between pulses 93 implemented, for example, by a PI controller. The compensated angular position of the motor 70 is used to determine speed feedback. The speed feedback and the compensated angular position are both provided, to the motor control module 100 to generate the desired output voltage to control the motor 70.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for determining an angular position of a permanent magnet (PM) motor controlling an elevator cab, the PM motor including a rotor having at least one external rotating surface, the system comprising:
    a friction wheel configured to engage one of the at least one external rotating surfaces to cause rotation of the friction wheel responsive to rotation of the rotor;
    an encoder operatively connected to the friction wheel and configured to generate at least one signal corresponding to the rotation of the friction wheel;
    a target located on one of the at least one external rotating surfaces;
    a non-contact sensor mounted to the PM motor and configured to generate a signal corresponding to the target being located within a detection distance from the non-contact sensor; and
    a motor drive configured to control the PM motor, the motor drive including:
        a first input configured to receive the at least one signal corresponding to the rotation of the friction wheel,
        a second input configured to receive the signal from the non-contact sensor,
        a memory device configured to store a program, and
        a processor configured to execute the program to:
        determine an uncompensated angular position of the PM motor as a function of the at least one signal corresponding to the rotation of the friction wheel, and
        determine a compensated angular position of the PM motor as a function of the uncompensated angular position and of the signal from the non-contact sensor.

2. The system of claim 1 wherein the target is located at a reference position, the reference position is stored in the memory device, and the uncompensated angular position of the PM motor is further determined as a function of the reference position.

3. The system of claim 1 wherein the target is integrally formed with the rotating surface.

4. The system of claim 1 wherein the non-contact sensor is selected from one of a magnetic proximity sensor and an optical proximity sensor.

5. The system of claim 1 wherein the friction wheel has a first diameter, the rotating surface of the synchronous motor has a second diameter, and the processor is further configured to determine the uncompensated angular position of the PM motor as a function of a ratio between the first diameter and the second diameter.

6. A system for determining an angular position of a synchronous motor, the system comprising:
    an encoder having a friction wheel operatively coupled to the encoder, wherein the encoder is configured to generate a signal corresponding to an angular position of the friction wheel and wherein an outer surface of the friction wheel is configured to engage a rotating member of the synchronous motor;
    a target on the rotating member of the synchronous motor;
    a sensor fixedly mounted proximate to the rotating member of the synchronous motor and configured to generate a pulse when the target passes the sensor; and
    a motor drive configured to control operation of the synchronous motor, the motor drive including:
        a first input configured to receive the signal from the encoder,
        a second input configured to receive the pulse from the sensor,
        a memory device configured to store a program, and
        a processor configured to execute the program to determine the angular position of the synchronous motor as a function of the signal from the encoder and to compensate the angular position of the synchronous motor when the pulse is received at the second input.

7. The system of claim 6 wherein the sensor is a non-contact sensor configured to generate the pulse when the target is located within a detection distance from the sensor.

8. The system of claim 7 wherein the sensor is selected from one of a magnetic proximity sensor and an optical proximity sensor.

9. The system of claim 6 wherein the friction wheel has a first diameter, the rotating member of the synchronous motor has a second diameter, and the processor is further configured to determine the angular position of the synchronous motor as a function of a ratio between the first diameter and the second diameter.

10. The system of claim 6 wherein the target is located at a reference position and the angular position of the synchronous motor is further determined as a function of the reference position.

11. The system of claim 6 wherein the target is integrally formed with the rotating member.

12. A method of compensating for position error in a motor drive configured to control a synchronous motor, the method comprising the steps of:
    mounting an encoder having a friction wheel to the synchronous motor such that the friction wheel engages a rotating surface of the synchronous motor;
    mounting a sensor proximate to the rotating surface of the synchronous motor;
    affixing a target to the rotating surface of the synchronous motor such that the target passes the sensor once per revolution of the synchronous motor,
    generating a signal with the encoder corresponding to an angular position of the friction wheel;
    transmitting the signal to a processor in the motor drive;
    generating a pulse with the sensor each time the target passes the sensor;
    transmitting the pulse to the processor in the motor drive;
    determining an angular position of the synchronous motor in the processor as a function of the signal from the encoder; and compensating the angular position of the synchronous motor in the processor each time the pulse is received from the sensor.

13. The method of claim 12 wherein the sensor is a non-contact sensor configured to generate the pulse when the target is located within a detection distance from the sensor.

14. The method of claim 13 wherein the sensor is selected from one of a magnetic proximity sensor and an optical proximity sensor.

15. The method of claim 12 wherein the friction wheel has a first diameter, the rotating surface of the synchronous motor has a second diameter, and the angular position of the synchronous motor is determined also as a function of a ratio between the first diameter and the second diameter.

16. The method claim 12 wherein the target is located at a reference position and the angular position of the synchronous motor is determined also as a function of the reference position.

* * * * *